Patented May 27, 1947

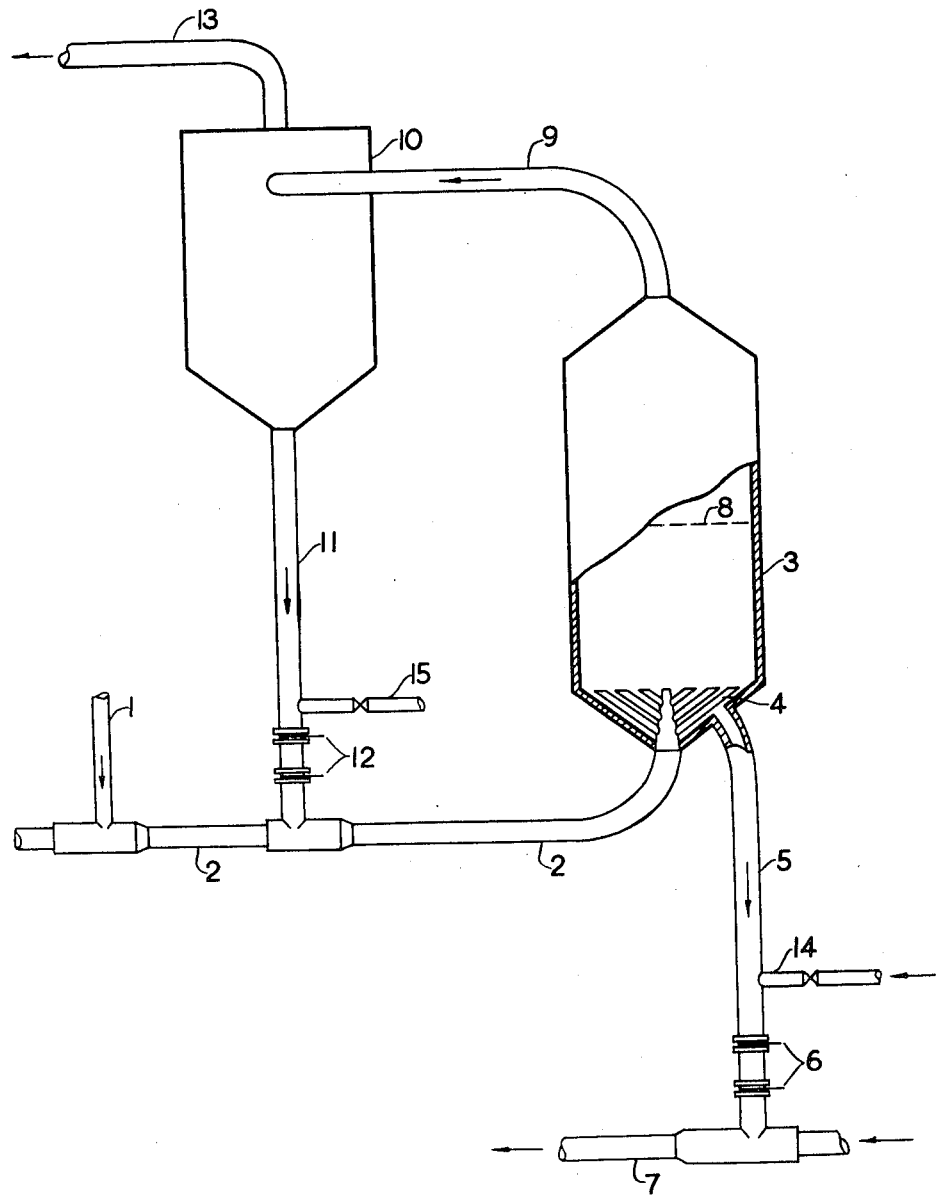

2,421,212

UNITED STATES PATENT OFFICE 2,421,212

OPERATION OF FLUIDIZED SYSTEMS

William V. Medlin, San Francisco, Calif., assignor to Shell Development Company, San Francisco, Calif., a corporation of Delaware Application November 3, 1943, Serial No. 509,012

6 Claims. (Cl. 196—52)

This invention relates to an improved method for contacting vapors or gases with finely divided solids in a so-called fluidized system. A more particular aspect of the invention relates to an improved method for effecting various catalytic conversions in the vapor phase with finely divided solid catalysts maintained in a so-called fluidized state. A still more particular aspect of the invention relates to an improved method for the cracking of hydrocarbon oils with finely divided solid cracking catalysts.

As is known, there are many processes in which it is desirable to contact vapors or gases with solid materials. In most of these processes (such, for instance, as the contacting of gases or vapors with solid catalysts, solid reagents, or solid adsorbents), the solid material is supplied in a suitable bed and the gases or vapors are passed through the bed under suitable conditions of temperature, pressure and contact time. This is a simple method and is satisfactory in many instances. In many cases, however, it is necessary or desirable to reactivate, heat, cool or otherwise treat the solid at relatively frequent intervals and in such cases this simple method has various drawbacks which are well recognized in the art. In order to overcome these drawbacks, various processes wherein the solid is employed in a finely divided, dust, or powdered state have been suggested. The application of the solid in a finely divided state has two main advantages which are (1) by employing the solid in a finely divided state a much greater available surface is obtained with a given amount of the solid—hence the effectiveness of the treatment is increased—and (2) by employing the solid in a finely divided state it is possible to transport it by means of gas streams, screw conveyors, etc. from one zone to another—hence it is possible to operate in a truly continuous manner. Most of the suggested processes, however, require the recycling and separation of enormous quantities of the finely divided solid in large and costly apparatus and are beset with various mechanical and engineering difficulties which have precluded their general acceptance. More recently, however, a new engineering technique has been developed. This technique utilizes a so-called fluidized system. The fluidized system, of which there are several variations, differs from most of the older suggested processes wherein the solid is in a finely divided state in that the finely divided solid is maintained in the reaction zone in a so-called fluidized or pseudo liquid state as distinguished from a suspended or pseudo gaseous state. Dry, non-sticky solids, when in a suitable state of subdivision, may be made to exist in three distinct states. If allowed to settle in bulk, they form a hard micro-porous solid mass which may be friable but is difficult to return to the original finely divided state except by grinding. If mixed with a sufficient quantity of agitated gas or vapor, the individual particles are uniformly dispersed and suspended in the gas or vapor. In this state the mixture may be compressed or expanded and the solid may be considered as being in a pseudo gaseous state. When they are aerated with a limited amount of gas or vapor they exist in a pseudo liquid or fluidized state. When in this fluidized state, they behave in most respects as a liquid. Thus, they flow freely; they may be pumped as a liquid; like a liquid they form an interface between the pseudo liquid and pseudo gas phase; gases may be "bubbled" up through the fluidized solid much as with a true liquid.

Besides the advantages mentioned above inherent in the use of the solid in a finely divided state, the fluidized systems have various additional important advantages. An important advantage is that since gases or vapors may be "bubbled" up through the fluidized solid only relatively small amounts of the finely divided solid are carried with the gas, and hence the problem of separating and removing the suspended finely divided solid from the gases or vapors is greatly simplified. Another important advantage is that the concentration of the finely divided solid in the contact zone is much greater, thus allowing much better contact with much smaller apparatus. Another important advantage is that since the finely divided solid remains in a pseudo liquid phase separated from the gaseous phase by an interface in the contact zone, the finely divided solid may be retained in the contact zone for any desired period of time and may be separately withdrawn at any desired rate without affecting the flow of the vapors or gases treated.

Fluidized systems are described and a typical fluidized system is illustrated in Ind. Eng. Chem. 35, 768–773 (1943).

In order to operate a fluidized system efficiently the solid should be substantially dry, non-sticky, and should be in a relatively fine state of subdivision. Generally, the solid is charged to the system in the form of a powder passing a standard No. 100 sieve. However, in some instances coarser powders, for instance passing a standard No. 20 sieve and retained on a standard No. 3 sieve, are charged. During operation of the system the solid gradually becomes more finely divided due to the grinding to which it is subjected while in the pseudo liquid state and during transportation within the system. As the material is used in the system, the particles tend to approach a uniform, very finely divided state presenting a very large surface.

In the operation of fluidized systems as hitherto practiced, the fine material produced by the grinding action and having an average particle size below that of the material originally applied has been considered very desirable and precautions have been taken to retain it in the system. In the present main application of fluidized systems, namely, the newly developed fluidized catalyst catalytic cracking processes, it has been shown that the ultra-fine catalyst produced by the grinding action is highly active. Also, contrary to expectation, it has been shown that as the content of ultra-fine particles builds up in the catalyst due to the grinding action the "carry-over" of catalyst with the gases and reacted vapors decreases. Consequently, in the fluid catalyst technique, means are provided to recover any of the ultra-fine material carried over with the gases or vapors and to return it to the main body of the catalyst. This recovery of the material may be effected efficiently with various conventional dust collecting apparatus such as a series of cyclone separators, bag filters and the like. In fluidized catalyst catalytic systems the most common method is to pass the gases carrying small amounts of the fine material through one or more cyclone separators and then through a Cottrell precipitator. The Cottrell precipitators are non-selective as to particle size and are very efficient in removing the last traces of even the very finest material from the gas or vapors. In some cases the ultra-fine material is recovered from the hydrocarbon product vapors by the use of scrubbing systems such, for instance, as those described in U. S. Patents 2,311,978 and 2,328,325.

It has now been found that in spite of the excellent activity of the ultra-fine material produced in the process and its apparent desirability, greatly improved results may be obtained in fluidized systems if the ultra-fine material is separated from the bulk of the finely divided solid and removed from the system. This unexpected improvement is confined to operations in which finely divided solid is contacted with a gas or vapor while in a fluidized or pseudo liquid state. The improvement has been traced to the considerably increased densities which may be maintained in the fluidized condition when the ultra-fine material is absent or reduced to very low concentrations. It has been found that the desired improved results may be achieved if the concentration of particles having a diameter below about 20 microns is maintained below about 5% by weight of the total solids. Throughout the description of the invention and in the claims the diameters of particles given are those determined by the sedimentation method. The diameter, as determined by sedimentation, is defined as the diameter of a sphere that settles at the same velocity as the particle being described. In the fluidized catalyst catalytic cracking systems presently used, the concentration of particles having a diameter below 20 microns is in the order of 15% to 20% by weight. Under practical operating conditions the density of the fluidized catalyst in the reactors and in the standpipes is about 15 to 16 lbs. per cubic foot, and 22 to 25 lbs. per cubic foot, respectively. When the concentration of particles having a diameter below 20 microns is reduced to below 5% by weight, the comparable densities of the fluidized catalyst in the reactors and in the standpipes are about 25 lbs. per cubic foot and 30 to 35 lbs. per cubic foot, respectively. This materially increased density, it is found, is a great advantage which can be utilized in several ways.

One of the drawbacks of the fluidized catalyst technique is the great cost of the elaborate plant required. This great cost is largely due to the fact that the various pieces of apparatus are tall and are superimposed on standpipes in an elaborate superstructure. The costs could be materially reduced if the heights of the plants could be reduced and every effort has been made to lower the heights of the plants to a minimum. When operating fluidized systems according to the present invention, the reactor, converter and/or regenerator, which are tall pieces of equipment, may be made much shorter, for instance, only ⅗ of the usual height. Also, the standpipes, over which the converters, reactors and regenerators are superimposed, may be made much shorter, for instance, only ⁵/₇ of the usual length. This allows the height of the plant to be greatly reduced and hence allows the fluidized catalyst technique to be carried out with a materially decreased capital investment.

The capital cost of the plant required for operating with the fluidized catalyst technique is not only materially reduced due to the decreased height of the plant but also by the elimination of costly apparatus. Thus, in the present fluidized catalyst catalytic cracking plants the exit gases from the regenerators are passed through cyclone separators and finally through Cottrell precipitators. In order that the Cottrell precipitators may operate efficiently it is necessary to cool the hot regeneration gases. In the present fluid catalyst catalytic cracking plants the coolers used for this purpose require capital expenditures of about $50,000 each and the Cottrell precipitators require capital expenditures of about $200,000 each. When operating according to the process of the present invention, both of these large capital investments, as well as the costs of operating and maintaining these units, are eliminated.

The substantial advantages of the method of operation of the present invention are, however, by no means limited to future plants, but may also be utilized in several ways in existing plants. Thus, for example, by operating according to the process of the invention in the existing fluidized catalyst catalytic cracking plants, all other conditions remaining the same, the cracking which usually runs around 45% may be increased by about 4%. This corresponds to about a 10% increase in efficiency and production. Or, if desired, the advantage of the present method of operation may be used to increase the production by a like amount by holding the conversion constant and increasing the amount of feed treated. Or, if desired, the normal conversion and throughput may be obtained using catalyst of a lower order of activity, for instance, a relatively inexpensive natural catalyst, such as Superfiltrol, or a used synthetic catalyst which would ordinarily be considered spent.

In processes such as catalytic cracking and the like, where organic materials are treated at elevated temperatures and carbonaceous deposits are continuously removed from the finely divided solid catalyst in a separate regeneration zone, the process of the invention may be of additional advantage in affording a decreased regeneration requirement. This is due to the fact that in fluidized catalyst systems the catalyst gradually becomes contaminated to a certain extent by iron or other ferrous metals eroded from the apparatus. This iron tends to increase the rate of carbon formation. In the process of the present invention a substantial part of the iron is found additional more efficient separating means such as bag filters or the like, but is not returned to the system. In a commercial cracking plant such as mentioned above, the amount of material removed from the system via line 13 may be, for example, about 2 to 10 tons per day depending upon the rate at which 0–20 micron material is produced in the fluid catalyst system. In the above mentioned typical case, as can be seen from the above data, at least 95% of all of the material having a diameter above 20 microns is separated and recycled back to the system, whereas the material withdrawn from the system consists almost entirely of 0–20 micron material. Thus, by controlling the rate of gas flow and the residence time in the chamber 3-cyclone 10 circuit, the material leaving chamber 3 via standpipe 5 may be made as free of 0–20 micron material as desired.

The process of the invention is particularly advantageous in fluidized catalyst systems in which the catalyst requires regeneration or reactivation and, in particular, in such systems when employed to effect various endothermic conversions such as cracking, refining, dehydrogenation, aromatization, dehydrocyclization, and the like. It is, however, not restricted to such systems nor to such applications. The fluid catalyst technique has wide application to many industrial operations which may or may not involve catalyst reactivation, and the improvement of the present invention is applicable to all of them.

I claim as my invention:

1. In the operation of a fluidized system wherein a solid in the form of particles ranging from about 0 microns diameter up to about 100 mesh is cycled through a reaction or treating zone and is maintained in a fluidized condition in said reaction or treating zone by means of a stream of gas or vapor which normally carries with it in suspension a portion of the solid particles, the improvement which comprises continuously separating suspended particles from said gas or vapor in a fractional manner, thereby to separate portions of the solid particles having different average particle sizes, recycling to the main portion of said solid separated particles having a diameter of from about 20 microns up and withdrawing from the system particles having a diameter below about 20 microns in such an amount to maintain the concentration of particles between 0 and 20 microns in said system below about 5%.

2. In the operation of a fluidized system wherein a solid in the form of particles range from about 0 microns diameter up to about 100 mesh is continuously recycled through two separate reaction or treating zones wherein it is contacted in a fluidized state with two separate streams of gases or vapors which normally carry a portion of said particles in suspension, the improvement which comprises continuously separating suspended particles from the gas or vapor from at least one of said treating or reaction zones in a fractional manner, thereby to separate portions of the solid particles having different average particle sizes, recycling to the main portion of said solid separated particles having a diameter below about 20 microns in such an amount to maintain the concentration of particles between 0 and 20 microns in said system below about 5%.

3. In a process for effecting a catalytic conversion or reaction in the vapor phase in a so-called fluidized catalyst system wherein a solid catalyst in the form of particles ranging from about 0 microns in diameter up to about 100 mesh is recycled through a reaction or treating zone and is maintained in a fluidized condition in said reaction or treating zone by means of a stream of vapor to be converted or reacted, which vapor normally carries with it in suspension a portion of the catalyst particles, the improvement which comprises continuously separating suspended catalyst particles from the treated or converted vapor in a fractional manner, thereby to separate portions of the catalyst particles having different average particle size, recycling to the main portion of said catalyst separated particles having a diameter of from about 20 microns up and withdrawing from the system particles having a diameter below about 20 microns in such an amount to maintain the concentration of particles between 0 and 20 microns in said system below about 5%.

4. In a process for effecting a catalytic conversion or reaction in the vapor phase in a so-called fluidized catalyst system wherein a solid catalyst in the form of particles ranging from about 0 microns diameter up to about 100 mesh is recycled through a conversion or reaction zone and then through a separate regeneration zone wherein the catalyst is maintained in a fluidized condition by means of a stream of regeneration gas which normally carried with it in suspension a portion of the catalyst particles, the improvement which comprises continuously separating suspended catalyst particles from the regeneration gas in a fractional manner, thereby to separate portions of the catalyst particles having different average particle size, recycling to the main portion of said catalyst separated particles having the diameter of from about 20 microns up and withdrawing from the system particles having a diameter below about 20 microns in such an amount to maintain the concentration of particles between 0 and 20 microns in said system below about 5%.

5. In a process for the catalytic cracking of vapors of a hydrocarbon oil in a so-called fluid catalyst process wherein a cracking catalyst in the form of particles ranging from about 0 microns in diameter up to about 100 mesh is cycled through a cracking zone and through a separate regeneration zone and wherein the catalyst is maintained in a fluidized condition in said regeneration zone by means of the regeneration gas which gas normally carries with it a portion of the catalyst particles in suspension, the improvement which comprises continuously separating suspended catalyst particles from the regeneration gas in a fractional manner, thereby to separate portions of the catalyst particles having different average particle sizes, recycling to the main portion of said catalyst separated particles having a diameter of from about 20 microns up and withdrawing from the system particles having a diameter below about 20 microns in such an amount to maintain the concentration of particles between 0 and 20 microns in said system below about 5%.

6. In a process for the catalytic cracking of vapors of a hydrocarbon oil in a so-called fluid catalyst process wherein the vapors of the oil to be cracked are contacted with a solid cracking catalyst in the form of particles ranging from about 0 microns diameter up to about 100 mesh while maintaining the catalyst in a fluidized state and wherein the catalyst is recycled through a separate regeneration zone wherein it is contact-with the fine particles of catalyst removed from the system.

In operating fluid systems according to the process of the invention, the separation of the particles having a diameter below about 20 microns from the main portion of the finely divided solid and the removal of the separated portion from the system may be accomplished in a number of ways. One simple method is to continuously suspended a portion of the finely divided solid in a stream of gas or vapor (in the pseudo gaseous state); pass the stream of gas containing the suspended particles through one or more dust collecting devices wherein the finely divided solid is separated from the gas or vapors in separate portions having different particle sizes; recycle to the main body of finely divided solid at least a portion of the separated finely divided solid having an average diameter above about 20 microns; and withdraw from the system the portion of finely divided solid having an average diameter below about 20 microns. The separation of the suspended solid in fractions having different average particle sizes from the gas or vapor may be effected by means of screens, filters or the like but is preferably effected by means of gravity settling, either with or without the help of centrifugal action. Thus, the gas may be simply passed through a series of enlarged zones of decreasing gas velocity. A preferred method is to pass the gas or vapor carrying the suspended solid through cyclone-type separators. The average diameter of the particles separated may be controlled by the design of the separators or by the rate of flow of the gas or vapor, or by both of these means.

The amount of catalyst continuously subjected to the described fractionation is, according to the process of the invention, sufficient to retain the concentration of particles having a diameter below 20 microns at a concentration below about 5% by weight. In most cases the effluent gases from the fluidized system normally carry more than the minimum amount of solid required. In fluidized catalyst catalytic cracking systems, for example, it is sufficient to pass only the flue gases from the regenerator through the separators.

One arrangement of apparatus suitable for effecting the desired separation and removal of 0-20 micron material from finely divided catalyst in a fluid catalyst system is illustrated in the attached drawing. Referring to the drawing, the material from a source such as a fluid catalyst reactor not shown, enters via line 1 and is picked up by air or a stream of other gas or vapor and carried via line 2 to a chamber 3. The mixture of finely divided catalyst and gas enters chamber 3 near the bottom via a distributor 4. At the same time an approximately equivalent amount of finely divided catalyst is continuously withdrawn from chamber 3 via standpipe 5. A small amount of air or other gas may be introduced via lines 14 and 15 to maintain the material in pipes 5 and 11 in a free flowing condition. The material withdrawn via standpipe 5 after passing valve arrangement 6 passes into line 7 wherein it is picked up by a stream of gas or vapor and recycled back to the fluid catalyst system. If the chamber 3 is a fluid catalyst regenerator the catalyst entering via 1 is partially spent catalyst; the catalyst withdrawn from the standpipe 5 is regenerated catalyst; and the gas introduced via line 2 is an oxygen containing gas such as air. The amount of air or other gas introduced via line 2 is such as to transport the catalyst into chamber 3 and to maintain the catalyst in chamber 3 in a dense or so-called fluidized state. This amount of gas may vary considerably depending upon the viscosity of the gas and the density of the catalyst. However, it is usually such an amount that the linear upward velocity of the gas in the free space above the dense phase in chamber 3 is between about 0.5 and 2 feet per second. The rate of catalyst withdrawal via standpipe 5 is adjusted to maintain a suitable amount of the catalyst in the dense or fluidized phase, for instance up to about line 8. In a typical fluid catalyst regenerator, for example, the chamber 3 is about 40 feet in diameter, about 75 feet high (about 35 feet between the conical sections) and to line 8 representing the height of the upper surface of the fluidized catalyst may be from about 8 to about 20 feet above the outlet of the distributor 4. In such a regenerator the catalyst inventory is usually about 500 tons and the cycle rate through chamber 3 may be, for example, about 25 tons per minute. The air or other gas introduced via line 2 "bubbles" up through the fluidized catalyst in chamber 3 and leaves chamber 3 via line 8. This air or other gas contains a certain amount of the catalyst in suspension. The amount depends upon the fineness of the catalyst, the density of the catalyst, the viscosity of the gas, the velocity of the gas, and the size of the space above the dense or fluidized phase. When operating according to the invention the amount of material having a diameter of less than 20 microns is maintained below about 5%. The material entering chamber 3 therefore contains about 5% or less of 0-20 micron particles. If the material entering via line 2 contains about 5% of 0-20 micron particles the amount of catalyst carried out of chamber 3 via line 8 in suspension may be, for example, about 1 pound per thousand cubic feet of gas when the linear velocity of the gas in the upper section is between about 0.6 and 1.1 feet per second. A typical size analysis of the suspended material in the case of a synthetic silica-alumina cracking catalyst is, for example, as follows:

| | Per cent |
|---|---|
| 0-20 micron | 88 |
| 20-40 micron | 11.1 |
| 40-60 micron | 0.6 |
| 60-80 micron | 0.4 |

The gas carrying the suspended catalyst in line 9 passes to a cyclone separator 10. A typical efficiency versus particle size curve for cyclone separators can be plotted from the following data:

| Per cent Efficiency of Separation | Particle Size, Microns |
|---|---|
| 52 | 5 |
| 72 | 10 |
| 85 | 15 |
| 95 | 20 |
| 98 | 25 |
| 99 | 30 |

This data is for a typical flue gas having a viscosity of 0.035 cp. and for a catalyst having a specific gravity of 2.08. The catalyst separated in cyclone separator 10 is withdrawn via standpipe 11 and valve arrangement 12 and is recycled back to chamber 3 for further treatment via line 2. The fine material which is not separated in the cyclone separator is carried out with the gas via line 13. This material may be recovered by ed with the regeneration gas which normally tends to suspend and carry a portion of the catalyst particles, the improvement which comprises separating suspended catalyst particles from said regeneration gas in a fractional manner, thereby to separate portions of the catalyst particles having different average particle sizes, recycling to the main portion of said catalyst separated particles having a diameter of from about 20 microns up and withdrawing from the system particles having a diameter below about 20 microns in such an amount to maintain the concentration of particles between 0 and 20 microns in said system below about 5%.

WILLIAM V. MEDLIN.

REFERENCES CITED

The following references are of record in the file of this patent:

UNITED STATES PATENTS

| Number | Name | Date |
| --- | --- | --- |
| 2,290,580 | Degnen et al. | July 21, 1942 |
| 2,302,209 | Goddin | Nov. 17, 1942 |
| 2,311,978 | Conn I | Feb. 23, 1943 |
| 2,273,076 | Voorhees | Feb. 17, 1942 |
| 2,322,019 | Hemminger | June 15, 1943 |
| 2,326,705 | Thiele et al. | Aug. 10, 1943 |
| 2,327,175 | Conn II | Aug. 17, 1943 |
| 2,337,684 | Scheineman | Dec. 28, 1943 |
| 2,355,016 | Stein | Aug. 1, 1944 |
| 2,356,717 | Williams | Aug. 22, 1944 |
| 2,361,978 | Swearingen | Nov. 7, 1944 |

FOREIGN PATENTS

| Number | Country | Date |
| --- | --- | --- |
| 527,307 | Great Britain | Oct. 7, 1940 |